United States Patent
White (10) Patent No.: US 9,075,432 B2
(45) Date of Patent: Jul. 7, 2015

(54) METHOD AND APPARATUS FOR SHARING CONTENT

(71) Applicant: Nokia Technologies Oy, Espoo (FI)

(72) Inventor: Sean White, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 30 days.

(21) Appl. No.: 13/725,573

(22) Filed: Dec. 21, 2012

(65) Prior Publication Data

US 2014/0176419 A1 Jun. 26, 2014

(51) Int. Cl.
*G06F 3/01* (2006.01)
*G06F 17/30* (2006.01)

(52) U.S. Cl.
CPC ............ *G06F 3/01* (2013.01); *G06F 17/30047* (2013.01); *G06F 17/30879* (2013.01)

(58) Field of Classification Search
CPC ........... G06F 3/01; G06F 3/033; G06F 3/042; G06F 3/048; G06F 17/30; G06F 17/30047; G06F 17/30244; G06F 17/30247–17/30262; G06F 17/30879; G06F 17/30781; G06F 17/30784; G06F 17/3079
USPC .......................... 345/204–214, 690–699, 156
See application file for complete search history.

(56) References Cited

U.S. PATENT DOCUMENTS

| | | | | |
|---|---|---|---|---|
| 7,296,747 | B2 * | 11/2007 | Rohs ........................ | 235/462.08 |
| 2005/0139680 | A1 | 6/2005 | Anttila et al. | |
| 2006/0038833 | A1 | 2/2006 | Mallinson et al. | |
| 2006/0071076 | A1 * | 4/2006 | Tamayama .................... | 235/454 |
| 2006/0136129 | A1 * | 6/2006 | Yokozawa ..................... | 701/211 |
| 2007/0008321 | A1 * | 1/2007 | Gallagher et al. ............. | 345/473 |
| 2007/0168488 | A1 * | 7/2007 | Deguchi et al. ............... | 709/223 |
| 2010/0082491 | A1 * | 4/2010 | Rosenblatt et al. ............ | 705/65 |
| 2010/0163613 | A1 * | 7/2010 | Bucher et al. ................. | 235/375 |
| 2010/0174599 | A1 * | 7/2010 | Rosenblatt et al. ......... | 705/14.37 |
| 2011/0101086 | A1 | 5/2011 | Yach | |
| 2011/0183612 | A1 | 7/2011 | Bregman-Amitai et al. | |
| 2011/0295502 | A1 | 12/2011 | Faenger | |
| 2012/0027303 | A1 * | 2/2012 | Cok .............................. | 382/190 |
| 2012/0223883 | A1 | 9/2012 | Solomon | |
| 2012/0314082 | A1 * | 12/2012 | Bezine et al. ................. | 348/161 |

(Continued)

FOREIGN PATENT DOCUMENTS

EP 2391109 A1 11/2011

OTHER PUBLICATIONS

Saxena, N et al., *Secure Device Pairing Based on a Visual Channel (short paper)*, originally retrieved from: http://ieeexplore.ieee.org/stap/stamp.jsp?arnumbers=1624021; dated <ay 2006.

(Continued)

*Primary Examiner* — Dmitriy Bolotin
(74) *Attorney, Agent, or Firm* — Alston & Bird LLP (57) ABSTRACT

A method, apparatus, and computer program product are provided to facilitate sharing of content between various computing devices. In the context of a method, an image of an external apparatus is received that includes information presented upon a display of the external apparatus. The method may also cause a content request to be provided that requests content upon which the information presented upon the display of the external apparatus is based. In response to the request, the method may receive the content upon which the information presented upon the display of the external apparatus is based.

20 Claims, 5 Drawing Sheets

(56) References Cited

U.S. PATENT DOCUMENTS

| | | | |
|---|---|---|---|
| 2013/0107062 A1* | 5/2013 | Okazaki | 348/207.1 |
| 2013/0321651 A1* | 12/2013 | Ichikawa | 348/207.1 |
| 2014/0006567 A1* | 1/2014 | Ducrou et al. | 709/220 |
| 2014/0176395 A1* | 6/2014 | White | 345/2.2 |

OTHER PUBLICATIONS

International Search Report and Written Opinion for Application No. PCT/FI2013/051114 dated Mar. 7, 2014.

* cited by examiner

METHOD AND APPARATUS FOR SHARING CONTENT

TECHNOLOGICAL FIELD

An example embodiment relates generally to the sharing of content between computing devices and, more particularly, to the sharing of content that has been presented upon the display of an external apparatus.

BACKGROUND

It is oftentimes desirable to share content between computing devices. In this regard, it may be desired to share documents, videos, photographs, audio files or the like that are stored by one computing device with another computing device. By way of example, one family member may have captured an image during a family reunion and may have stored the image upon their computing device. In this example, another family member may have been unable to attend the family reunion and may request that a copy of the image be shared with them.

In instances in which the computing devices are in communication with one another, either directly via a wireless local area network, Bluetooth or another type of direct connection or indirectly via a wide area network, e.g., the Internet, a cellular network or the like, content may be shared between the computing devices. In some instances, however, the computing devices may not be in communication with one another such that the sharing of the content between the computing devices may prove to be more challenging. In this instance, the content may be presented upon the display of one of the computing devices. In instances in which the other computing device with which the content is desired to be shared includes or is otherwise associated with a camera, an image of the content that is presented upon the display of one computing device may be captured by the camera of the other computing device. As such, the other computing device may thereafter have an image of the content as presented upon the display. However, the image of the content that was presented upon the display is generally of lower quality, such as lower resolution, than the content itself. Additionally, the image of the content that was presented upon the display necessarily only includes the information that was presented upon the display and does not include any other related information, such as metadata that may be associated with and provide context for the content.

BRIEF SUMMARY

A method, apparatus, and computer program product are provided according to an example embodiment of the present invention in order to facilitate sharing of content between various computing devices. In this regard, the method, apparatus and computer program product of an example embodiment provide for the sharing of content in an efficient and intuitive manner and without requiring the users of the computing devices to engage in an involved procedure in order to establish communications between the computing devices in advance of sharing the content there between in order to provide for an enjoyable user experience. Additionally, the method, apparatus and computer program product of an example embodiment may provide for sharing of content in a manner that maintains the resolution and other properties of the content.

In one embodiment, a method is provided that includes receiving an image of an external apparatus including information presented upon a display of the external apparatus. The method of this embodiment also causes a content request to be provided that requests content upon which the information presented upon the display of the external apparatus is based. In response to the request, the method receives the content upon which the information presented upon the display of the external apparatus is based.

The method of an example embodiment may also determine that the image includes an image of the display of the external apparatus. The method may identify the external apparatus based upon the image of the external apparatus. Based upon the image of an external apparatus including information presented upon the display of the external apparatus and/or based upon a time at which the image of the external apparatus was captured, the method may identify the information presented upon the display of the external apparatus. In an example embodiment, the method may also receive a user input and cause the image of the external apparatus to be captured in response to the user input. The method may also receive metadata associated with the content upon which the information presented upon the display of the external apparatus is based.

In another embodiment, an apparatus is provided that includes at least one processor and at least one memory including computer program instructions with the at least one memory and the computer program instructions configured to, with the at least one processor, cause the apparatus at least to receive an image of an external apparatus including information presented upon a display of the external apparatus. The at least one memory and the computer program instructions are also configured to, with the at least one processor, cause the apparatus of this embodiment to causes a content request to be provided that requests content upon which the information presented upon the display of the external apparatus is based. In response to the request, the at least one memory and the computer program instructions may also be configured to, with the at least one processor, cause the apparatus to receive the content upon which the information presented upon the display of the external apparatus is based.

The at least one memory and the computer program instructions may also be configured to, with the at least one processor, cause the apparatus of an example embodiment to determine that the image includes an image of the display of the external apparatus. The at least one memory and the computer program instructions may also be configured to, with the at least one processor, cause the apparatus to identify the external apparatus based upon the image of the external apparatus. Based upon the image of an external apparatus including information presented upon the display of the external apparatus and/or based upon a time at which the image of the external apparatus was captured, the at least one memory and the computer program instructions may also be configured to, with the at least one processor, cause the apparatus to identify the information presented upon the display of the external apparatus. In an example embodiment, the at least one memory and the computer program instructions may also be configured to, with the at least one processor, cause the apparatus to receive a user input and cause the image of the external apparatus to be captured in response to the user input. The at least one memory and the computer program instructions may also be configured to, with the at least one processor, cause the apparatus receive metadata associated with the content upon which the information presented upon the display of the external apparatus is based.

In a further embodiment, a computer program product is provided that includes at least one non-transitory computer-readable storage medium bearing computer program instructions embodied therein for use with a computer with the computer program instructions including instructions that are configured to receive an image of an external apparatus including information presented upon a display of the external apparatus. The computer program instructions of this embodiment also include instructions configured to cause a content request to be provided that requests content upon which the information presented upon the display of the external apparatus is based. In response to the request, the computer program instructions may also include instructions configured to receive the content upon which the information presented upon the display of the external apparatus is based.

The computer program instructions of an example embodiment also include instructions configured to determine that the image includes an image of the display of the external apparatus. The computer program instructions may also include instructions configured to identify the external apparatus based upon the image of the external apparatus. Based upon the image of an external apparatus including information presented upon the display of the external apparatus and/or based upon a time at which the image of the external apparatus was captured, the computer program instructions may also include instructions configured to identify the information presented upon the display of the external apparatus. In an example embodiment, the computer program instructions may also include instructions configured to receive a user input and cause the image of the external apparatus to be captured in response to the user input. The computer program instructions may also include instructions configured to receive metadata associated with the content upon which the information presented upon the display of the external apparatus is based.

In yet another embodiment, an apparatus is provided that includes means for receiving an image of an external apparatus including information presented upon a display of the external apparatus. The apparatus of this embodiment also includes means for causing a content request to be provided that requests content upon which the information presented upon the display of the external apparatus is based. In response to the request, the apparatus also includes means for receiving the content upon which the information presented upon the display of the external apparatus is based.

DETAILED DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

In accordance with an example embodiment, a method, apparatus, and computer program product are provided in order to facilitate sharing of content between computing devices. In this regard, the method, apparatus, and computer program product may share content in the manner that maintains the quality, such as the resolution, of the content and that may cause information that is associated with the content, but that is not presented upon the display of one of the computing devices, to be shared with the other computing device. As such, the users of the computing devices that have shared the content may thereafter more fully interact with and enjoy the content. For example, an image that is stored by one of the computing devices may be presented upon the display of the computing device and shared with the other computing device in a manner that may maintain the quality, such as the resolution, of the content and that may also cause information that was not presented upon the display, but that is associated with the image, such as metadata, to be shared with the other computing device. However, the method, apparatus, and computer program product of an example embodiment facilitate the sharing of the content in an intuitive manner without requiring the users of the computing devices to engage in an involved procedure in order to establish communications between the computing devices prior to sharing the content between the computing devices, thereby improving the user experience associated with the sharing of the content.

Figure 1:
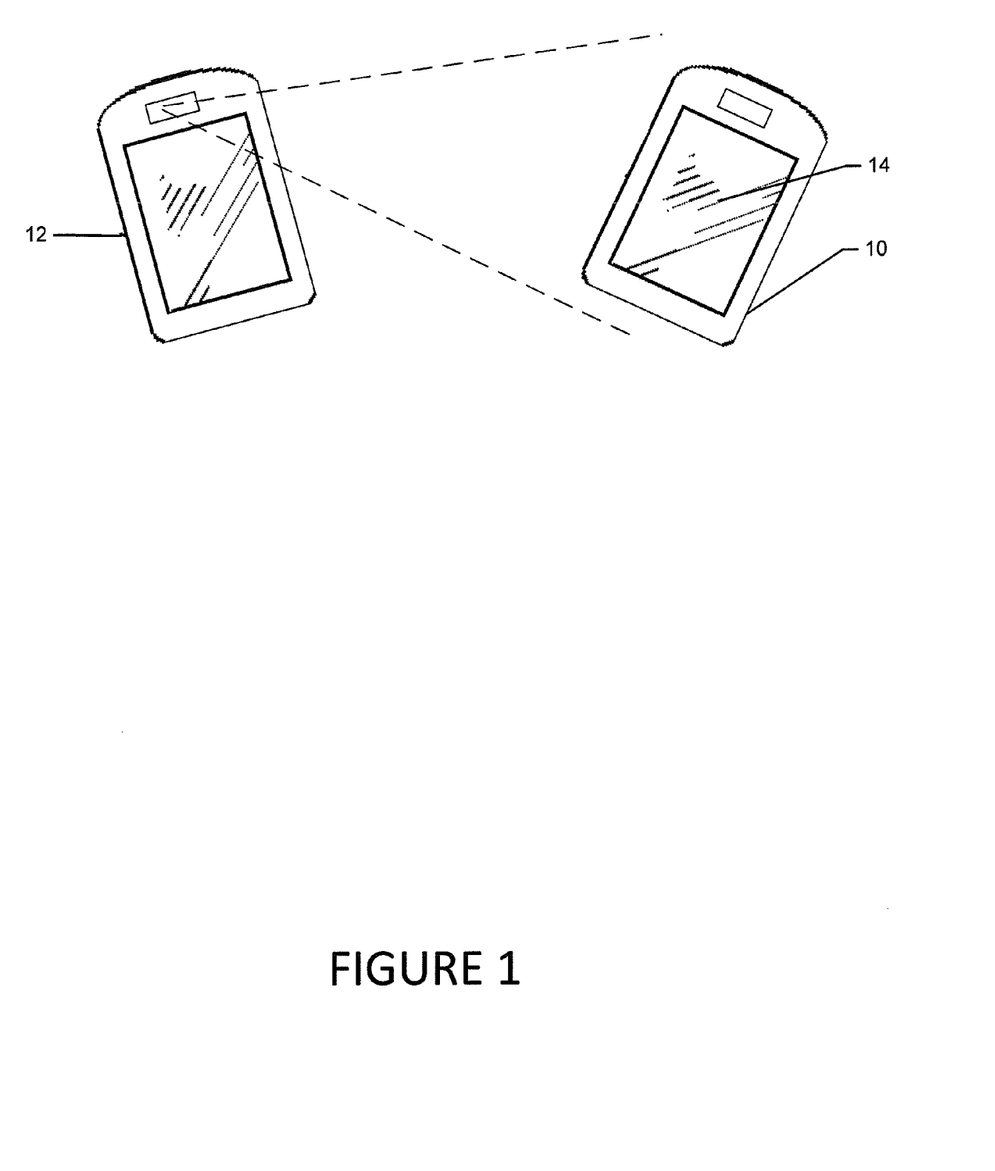
FIG. 1 is a perspective view of a pair of computing devices that may be configured to share content in accordance with an example embodiment of the present invention.

Referring now to FIG. 1, a pair of computing devices 10, 12 between which content is to be shared are illustrated. While FIG. 1 depicts two computing devices, content may be shared between a greater number of computing devices in other embodiments. In accordance with an example embodiment of the present invention, content may be shared between a variety of types of computing devices including mobile terminals as shown in FIG. 1 or fixed computing devices. In this regard, the mobile terminals between which the content may be shared may include, for example, a mobile telephone, a smartphone, a portable digital assistant (PDA), a tablet computer, a laptop computer, a touch surface, a gaming device, a camera, an electronic book, a pager, a mobile television, a gaming device, a camera, a video recorder, an audio/video player, a radio, a positioning device (e.g., global positioning system (GPS) device), or any combination of the aforementioned, and other types of voice and text communications systems. The fixed computing devices between which the content may be shared may include, for example, a desktop computer, a computer workstation or the like. While FIG. 1 depicts a pair of computing devices of the same type, such as a pair of mobile terminals, the method, apparatus, and computer program product of an example embodiment may be configured to share content between different types of computing devices, such as between a mobile terminal and a fixed computing device, in other embodiments.

As shown in FIG. 1, an image may be presented upon the display 14 of a first computing device 10. A second computing device 12 may cause an image of the content presented from the display to be captured by a camera or other image capturing module included within or otherwise associated with the second computing device. For example, the field of view of the camera of the second computing device is depicted by the dashed lines in FIG. 1 and includes the display of the first computing device. Based upon the image of the content presented upon the display of the first computing device, the content itself, as opposed to simply an image of that portion of the content that is presented upon the display of the first computing device, may be shared with the second computing device. Thus, the second computing device may, in one embodiment, not only receive the content in its full resolution, but may also receive information associated with the content, such as metadata, that is not presented upon the display of the first computing device but that facilitates use of the content by the second computing device.

Figure 2:
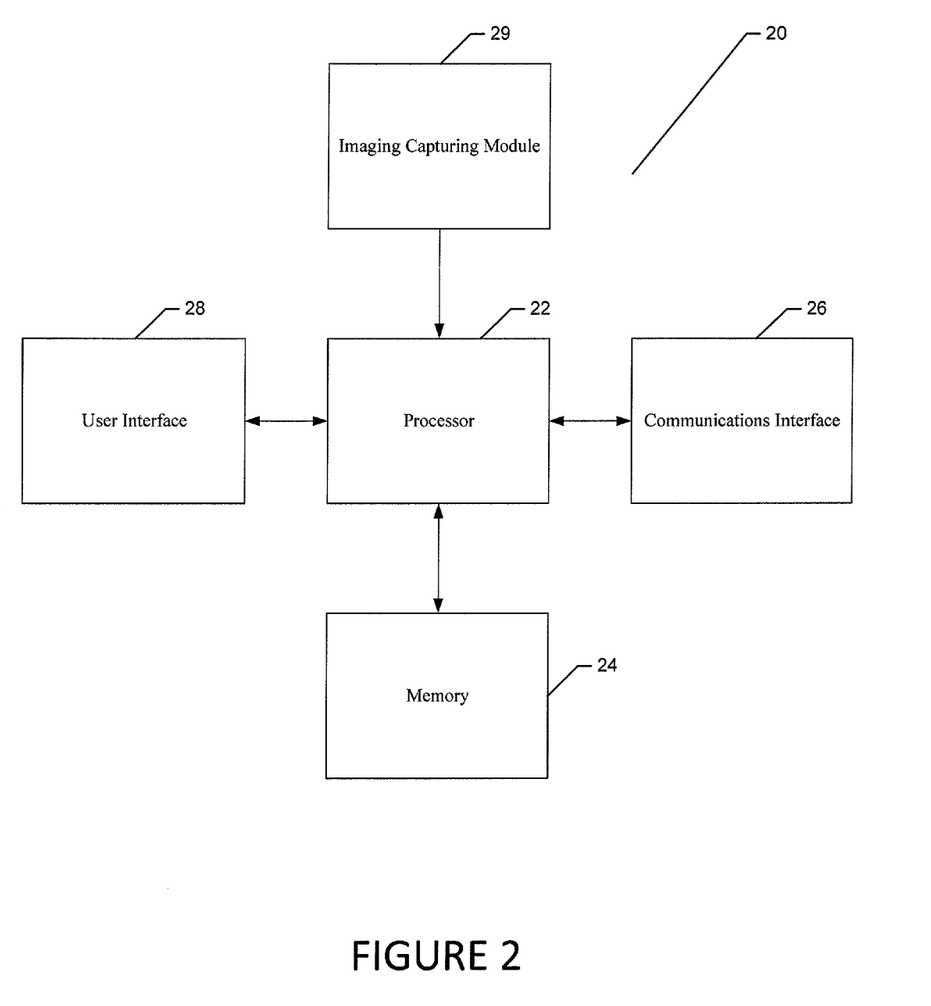
FIG. 2 is a block diagram of an apparatus that may be specifically configured in accordance with an example embodiment of the present invention.
Figure 4:
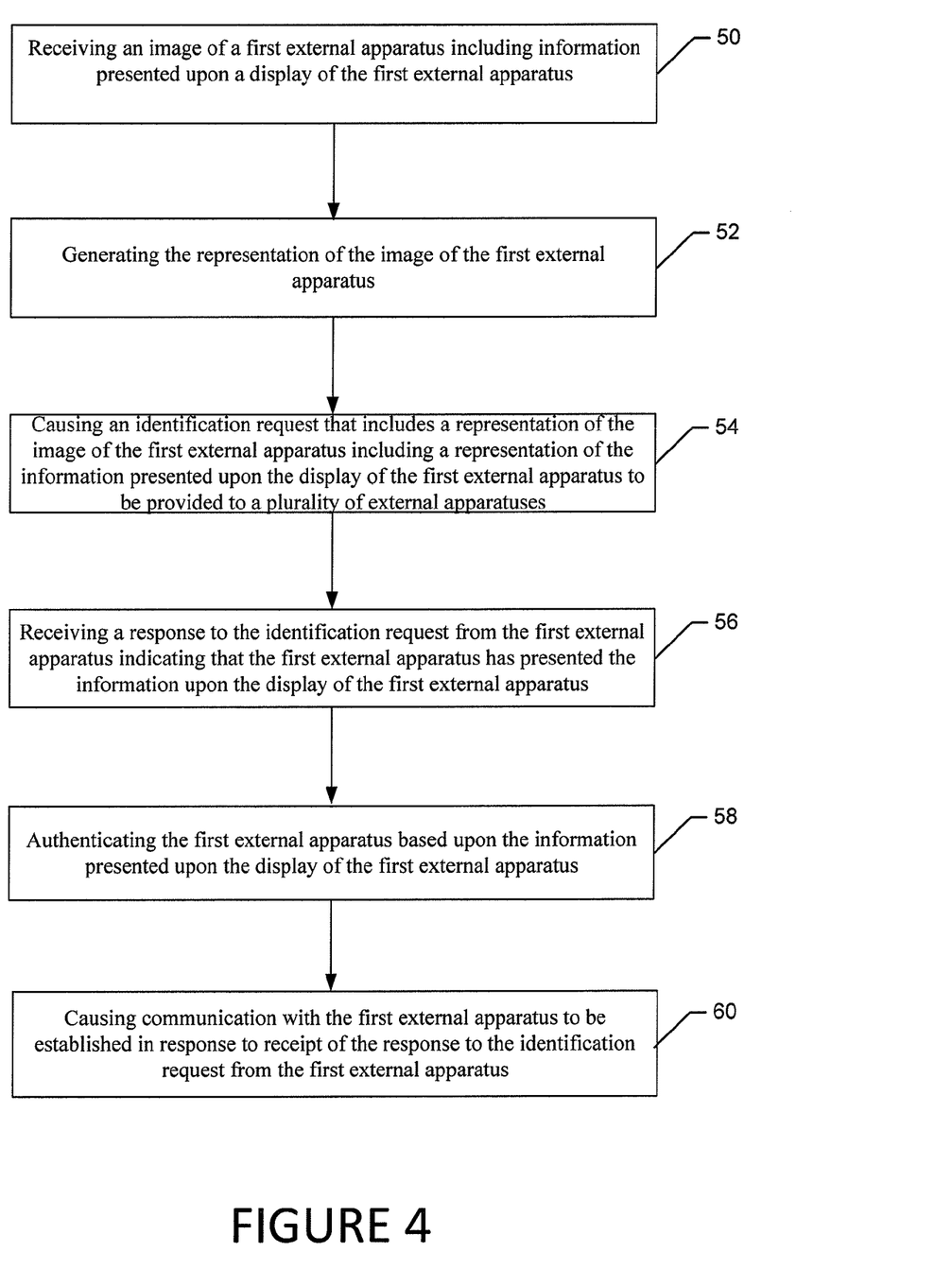
FIG. 4 is a flow chart illustrating operations performed in order to identify an external apparatus that presented information that may be, for example, shared in accordance with an example embodiment of the present invention.
Figure 5:
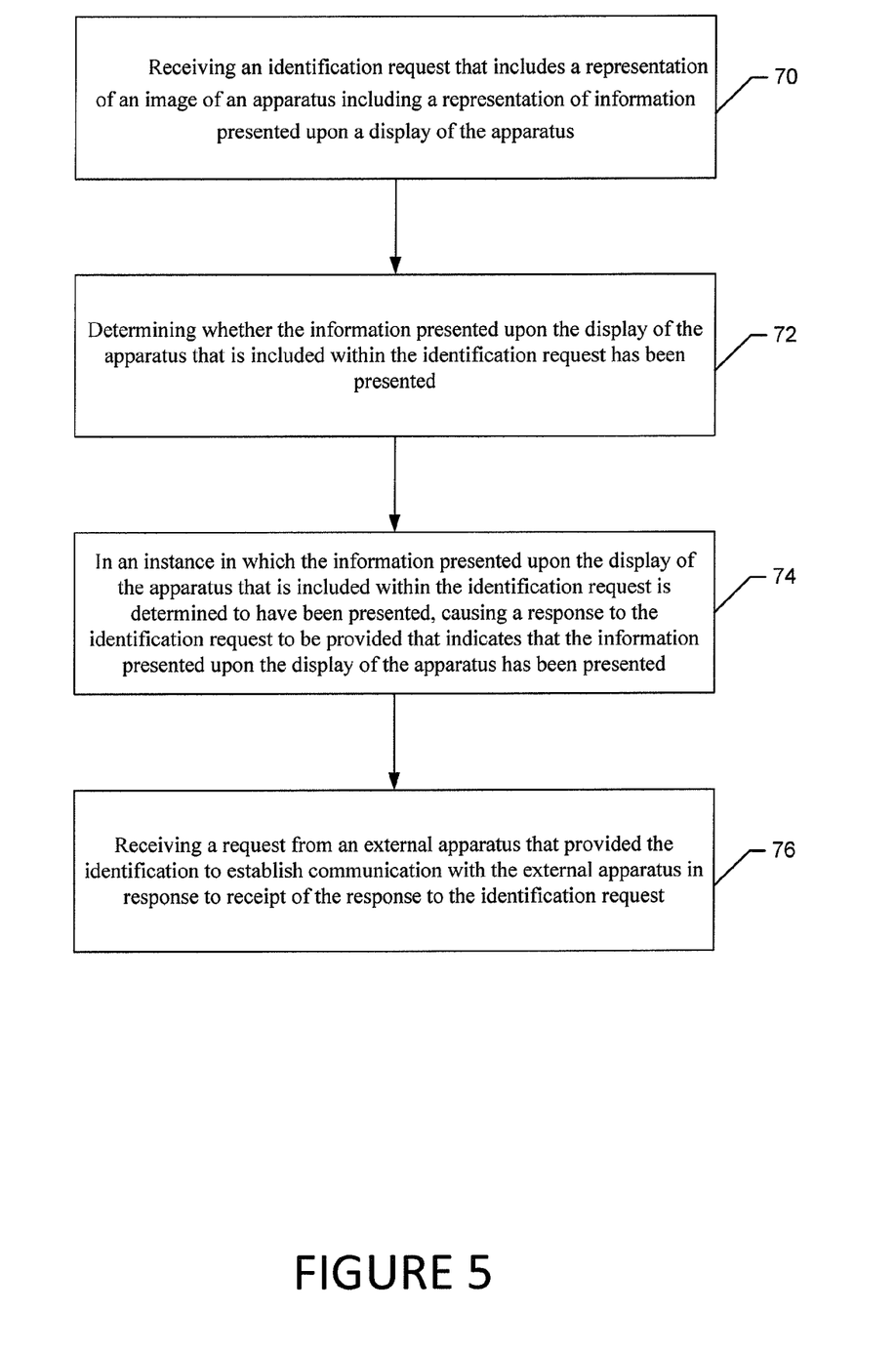
FIG. 5 is a flow chart illustrating operations performed in order to receive and respond to an identification request regarding information that has been presented in accordance with an example embodiment of the present invention.

The computing devices may include or otherwise be associated with an apparatus 20 as generally described below in conjunction with FIG. 2 for performing one or more of the operations set forth by the flowcharts of FIGS. 3-5 and also described below. In regards to the example embodiment of FIG. 1, the second computing device 12 that receives the content may include or otherwise be associated with the apparatus for performing the operations set forth by the flowcharts of FIGS. 3 and 4, and the first computing device 10 that provides the content may include or otherwise be associated with the apparatus for performing the operations set forth by the flowchart of FIG. 5. It should also be noted that while FIG. 2 illustrates one example of a configuration of an apparatus 20 for facilitating the sharing of content between computing devices, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 20 for facilitating the sharing of content between computing devices in accordance with one example embodiment may include or otherwise be in communication with a processor 22, a memory 24, a communication interface 26, a user interface 28 and an image capturing module, such as a camera 39. In some embodiments, the processor (and/or co-processors or any other processing circuitry assisting or otherwise associated with the processor) may be in communication with the memory device via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 20, such as by supporting communications with the other computing device. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms The apparatus 20 may include a user interface 28 that may, in turn, be in communication with the processor 22 to provide output to the user and, in some embodiments, to receive an indication of a user input. As such, the user interface 28 may include a display and, in some embodiments, may also include a keyboard, a mouse, a joystick, a touch screen, touch areas, soft keys, a microphone, a speaker, or other input/output mechanisms. The processor 22 may comprise user interface circuitry configured to control at least some functions of one or more user interface elements such as a display and, in some embodiments, a speaker, ringer, microphone and/or the like. The processor 22 and/or user interface circuitry comprising the processor may be configured to control one or more functions of one or more user interface elements through computer program instructions (e.g., software and/or firmware) stored on a memory accessible to the processor (e.g., memory 24, and/or the like).

As shown in FIG. 2, the apparatus 20 may also include an image capturing module 29, such as a camera, video and/or audio module, in communication with the processor 22. The image capturing element may be any means for capturing an image, video and/or audio for storage, display or transmission. As used herein, an image includes a still image as well as an image from a video recording. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while the memory 22 of the apparatus stores instructions for execution by the processor in the form of software necessary to create a digital image file from a captured image. In an example embodiment, the camera may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The method, apparatus 20 and computer program product of one embodiment may now be described in conjunction with the operations illustrated in FIG. 3. In this regard, the apparatus, such as the processor 22, the communications interface 26 or the like, may be configured to receive an image of an external apparatus including information presented upon a display of the external apparatus. See block 30 of FIG. 3. In an example embodiment of FIG. 1 in which the apparatus is embodied by or otherwise associated with the second computing device 12 that is to receive the content shared between the computing devices, the second computing device may receive an image of the first computing device 10 and, more particularly, an image of the information that is presented upon the display 14 of the first computing device. Thus, the apparatus may include means, such as the processor, the communications interface or the like, for receiving an image of the external apparatus.

The image of the external apparatus, such as the first computing device 10 in the embodiment of FIG. 1, that includes information presented upon the display of the external apparatus may be received in various manners. In an example embodiment, however, the apparatus 20, such as the processor 22, user interface 28 or the like, may receive a user input and the apparatus, such as the processor, the image capturing module 29 or the like, may cause the image of the external apparatus to be captured in response to the user input. For example, the user of the second computing device 12 may position the second computing device such that the view of the camera of the second computing device includes the display 14 of the first computing device 10 as shown, for example, by the dashed lines in FIG. 1. The second computing device may then receive user input directing that the image be captured by the camera and, in response, the camera may capture the image of the first computing device including the information presented upon the display of the first computing device. Thus, the apparatus of this embodiment may include means, such as the processor, the user interface or the like, for receiving user input and means, such as the processor, the image capturing module or the like, for causing the image of the external apparatus to be captured in response to the user input.

The apparatus 20, such as the processor 22, the communications interface 28 or the like, is also configured to cause a content request to be provided that requests content upon which the information presented upon the display of the external apparatus is based. See block 38 of FIG. 3. Thus, the apparatus does not simply rely upon the image of the information presented upon the display of the external apparatus, but, instead, solicits the content upon which the information presented upon the display of the external apparatus is based. As such, the apparatus of this embodiment includes means, such as the processor, the communications interface or the like, from causing the content request to be provided.

The apparatus 20 may be configured to identify the external apparatus having the display upon which the information was presented and to identify the information that was presented upon the display of the external apparatus in various manners in order to be able to provide a meaningful content request that identifies the information that was presented upon the display that is desired to be shared and that directs the content request to the external apparatus that presented the information upon its display. In one embodiment, the apparatus, such as the processor 22, may be configured to determine that the image of the external apparatus includes the display of the external apparatus. See block 32 of FIG. 3. The apparatus, such as the processor, may be configured to identify that the image includes the display of the external apparatus in various manners, such as by object recognition techniques. In another embodiment, the apparatus, such as the processor, may determine that the image includes the display of the external apparatus by causing the image to be presented upon the display of the second computing device 12 and by soliciting user input as to whether, or not, the image as presented by the second computing device is an image of the display of the external apparatus that is presenting information that is desired to be shared. Thus, the apparatus of this embodiment may include means, such as a processor or the like, for determining that the image includes the display of the external apparatus.

In an instance in which it is determined that the image received by the apparatus 20 includes the display of the external apparatus, the apparatus, such as the processor 22, may be configured to identify the external apparatus based upon the image of the external apparatus. See block 34 of FIG. 3. As described below in conjunction with FIGS. 4 and 5, the identification of the external apparatus may be performed in various manners. In one embodiment, however, the apparatus, such as the processor, may be configured to identify the external apparatus based upon object recognition techniques or user input as described above. Alternatively, the external apparatus may provide a unique identification code that identifies the external apparatus and that is included within the image of the display of the external apparatus that is received. In this regard, the unique identification code that identifies the external apparatus may be imprinted upon or otherwise visibly presented by the external apparatus. In one embodiment, for example, the information presented upon the display may not only include information associated with the content that is desired to be shared, but also may include a unique identification code that identifies the external apparatus. Still further, the external apparatus may alternately flash the information associated with the content that is desired to be shared and the unique identification code upon the display such that the apparatus may receive not only an image including the information associated with the content that is desired to be shared, but also an image of the unique identification code that is presented upon the display of the external apparatus. In this embodiment, the apparatus, such as the processor, may identify the external apparatus based upon the unique identification code, such as by reference to a listing stored in memory 24 of unique identification codes and corresponding information regarding the external apparatuses associated with the unique identification code. Thus, the apparatus of this embodiment may include means, such as a processor or the like, for identifying the external apparatus based upon the image of the external apparatus.

The apparatus 20, such as the processor 22, may also be configured to identify the information presented upon the display of the external apparatus. See block 36 of FIG. 3. In this regard, the apparatus, such as the processor, may be configured to identify the information presented upon the display of the external apparatus based upon the image of the external apparatus, including information presented upon the display of the external apparatus. The apparatus, such as the processor, may be configured to identify the information presented upon the display of the external apparatus based upon the information presented upon the display of the external apparatus in various manners. For example, the apparatus, such as the processor, may be configured to extract one or more visual features from the information presented upon the display of the external apparatus and to then utilize the one or more visual features as a key in order to identify the information that is presented upon the display of the external apparatus. Alternatively, the apparatus, such as the processor, may be configured to generate a color histogram based upon the image of the external apparatus such that the information presented upon the display of the external apparatus may be identified by the color histogram. In a further embodiment, the information that is presented upon the display of the external apparatus may include a reference that is encoded therein via steganography. In this embodiment, the apparatus, such as the processor, may interpret the reference that is encoded within the information presented upon the display of the external apparatus via steganography in order to identify the information presented upon the display of the external apparatus. Additionally or alternatively, the apparatus, such as the processor, may be configured to identify the information presented upon the display of the external apparatus based upon the time at which the image of the external apparatus was captured. Thus, the apparatus of this embodiment may include means, such as the processor or the like, for identifying the information presented upon the display of the external apparatus.

Figure 3:
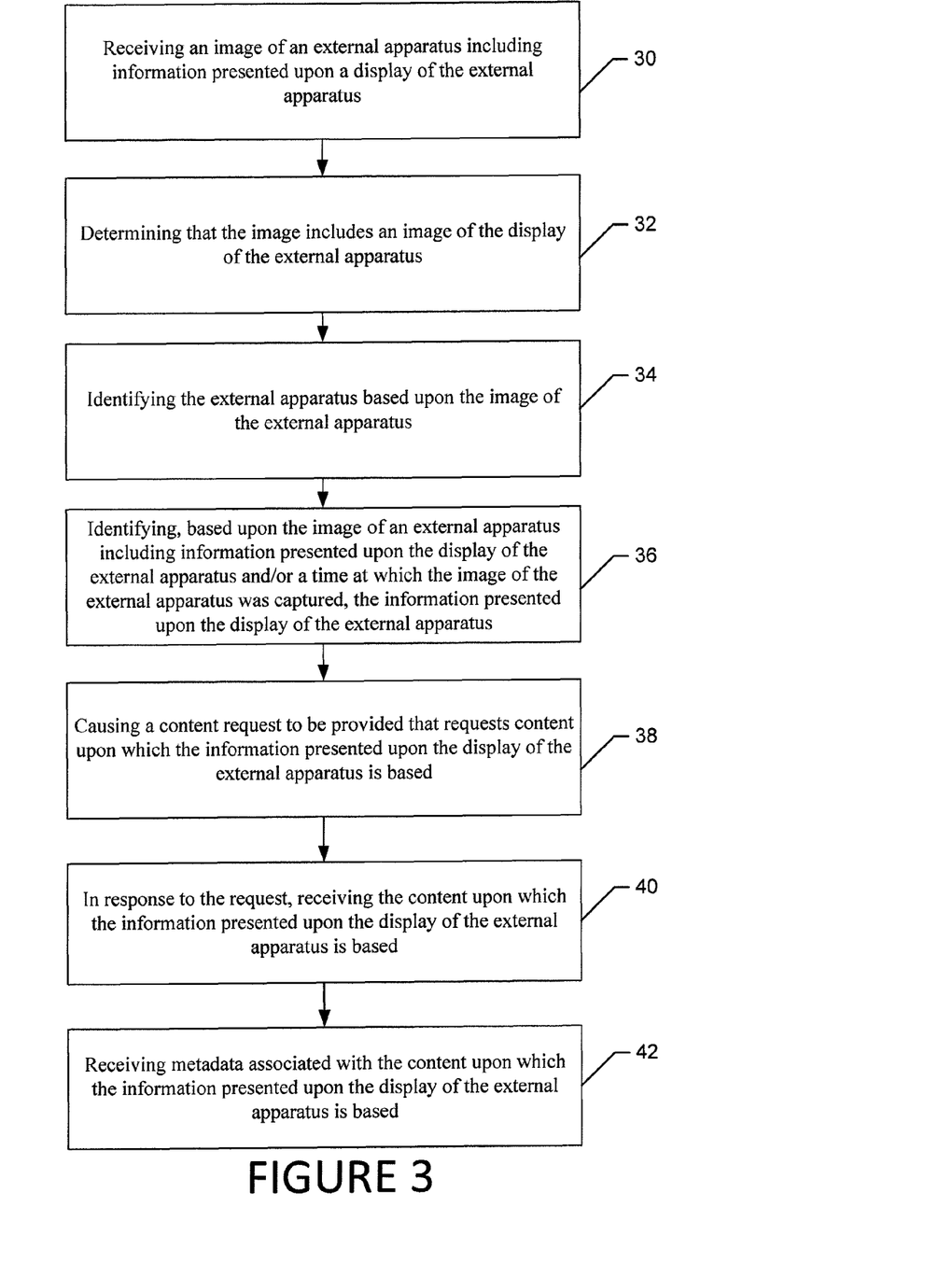
FIG. 3 is a flow chart illustrating operations performed in order to share content in accordance with an example embodiment of the present invention.

The content request that is then provided as shown in block 38 of FIG. 3 in order to request content upon which the information presented upon the display of the external apparatus is based may, in one embodiment, be specifically directed to the external apparatus in an instance in which the external apparatus has been identified based upon the image of the external apparatus. Additionally or alternatively, the content request may identify the information presented upon the display of the external apparatus for which the associated content is requested. As described above by way of example, the content may be identified based upon the information that is presented on the display of the external apparatus, such as by being identified by one or more visual features, a color histogram, an encoded reference and/or the time of which the image of the external apparatus was captured. In an instance in which the content that is requested to be shared is identified by the time at which the information presented upon the display of the external apparatus was captured, the time may be in the absolute time, such as the time of day, or may be a relative time, such as the duration of time prior to the content request at which the image of the external apparatus was captured. In an embodiment in which the content request identifies the information presented upon the display of the external apparatus, but does not specifically identify the external apparatus, the content request may be provided to a plurality of external apparatuses such that the external apparatus that did present the information that was identified by the content request may identify itself as described below in conjunction with FIGS. 4 and 5.

The apparatus 20, such as the processor 22, the communications interface 26 or the like, may also be configured to receive, in response to the content request, the content upon which the information presented upon the display of the external apparatus is based. See block 40 of FIG. 3. By receiving the content upon which the information presented upon the display of the external apparatus is based, the apparatus, such as the second computing device 12 in the embodiment of FIG. 1, may generally receive content having higher quality including greater resolution than that provided by the image of the display of the external apparatus. In addition, the content that is received may optionally include content that is associated with the information presented upon the display of the external apparatus, but that was not presented upon the display of the external apparatus at the time the image was captured. For example, the content may be a multi-page document of which a portion of a single page was presented upon the display of the external apparatus. However, the content that is received by the apparatus, such as the second computing device in the embodiment of FIG. 1, in response to a content request may include the entire multi-page document including those pages that were not presented by the display of the external apparatus at the time that the image was captured. Thus, the content received by the apparatus, such as the second computing device, may be both more fulsome and of higher quality in comparison to the information presented upon the display of the external apparatus that was included within the image received by the apparatus, such as the second computing device. Thus, the apparatus may include means, such as the processor, the communications interface or the like, for receiving content upon which the information presented upon the display of the external apparatus is based.

In one embodiment, the apparatus 20, such as the processor 22, the communications interface 26 or the like, may also receive metadata associated with the content upon which the information presented upon the display of the external apparatus is based. See block 42 of FIG. 3. The metadata may be received in conjunction with the content itself in response to the content request. By also receiving metadata, the context of the content that is received may be more readily determined in order to facilitate usage of the content by the apparatus, such as the second computing device 12, including facilitation of the storage, association and retrieval of the content. The apparatus of one embodiment may therefore also include means, such as the processor, the communications interface or the like, for receiving metadata associated with the content upon which the information presented upon the display of the external apparatus is based.

As described above, the apparatus 20 may be configured to communicate directly with the external apparatus with the apparatus causing the content request to be directed to the external apparatus and, in turn, receiving the requested content from the external apparatus. However, the apparatus may, instead, communicate with a third party, such as a server or other network entity which may also include or otherwise be embodied by an apparatus of the type shown in FIG. 2 and described above. In this embodiment, the apparatus embodied by the second computing device 12 may cause the content request include the image of the external apparatus to be transmitted to the third party. The third party may be configured to determine the information that is presented upon the display of the external apparatus and, in some instances, to also identify the external apparatus based upon the image of the external apparatus, thereby permitting the apparatus embodied by the second computing device to offload at least some of the image processing to the third party. In this embodiment, the third party may provide an indication to the apparatus embodied by the second computing device of the identity of the information that is presented upon the display of the external apparatus and, in some instances, the identity of the external apparatus such that the apparatus embodied by the second computing device may then issue another content request for the information to the external apparatus. Alternatively, the third party may issue a content request to the external apparatus that identifies the information that is to be shared such that the external apparatus may thereafter cause the information to be transmitted either directly to the apparatus embodied by the second computing device or to the third party which, in turn, may relay the information to the apparatus embodied by the second computing device.

As described above, the external apparatus may be identified in various manners. However, the method, apparatus, and computer program product of one example embodiment may be configured to identify the external apparatus in the manner described below in conjunction with FIG. 4. In this regard and as described above in conjunction with operation 30 of FIG. 3, the apparatus 20, such as the processor 22, the communications interface 26 or the like, may be configured to receive an image of the external apparatus (hereinafter referenced as a first external apparatus so as to distinguish the first external apparatus from other external apparatuses) including information presented upon the display of the first external apparatus. See block 50 of FIG. 4. As described above, the first external apparatus may be embodied by the first computing device 10 having a display 14 upon which information is presented. As also described above, the image of the first external apparatus may be received in various manners including by having caused in the image of the first external apparatus to be captured, such as by an image capturing module 29 in response to user input. In this regard, the apparatus may therefore include means, such as the processor 22, the communications interface 26 or the like, for receiving an image of the first external apparatus including information presented upon the display of the first external apparatus and means, such as the processor, the image capturing module or the like, for causing the image of the first external apparatus to be captured.

The apparatus 20 may include means, such as the processor 22, the communications interface 26 or the like, for causing an identification request that includes a representation of the image of the first external apparatus including a representation of the information presented upon the display of the first external apparatus to be provided to a plurality of external apparatuses. See block 54 of FIG. 4. The identification request may be configured in various manners so as to identify the information that was presented upon the display of the first external apparatus which the apparatus desires to be shared. In one embodiment, for example, the apparatus, such as the processor, may be configured to generate a representation of the image of the first external apparatus so as to identify the information presented upon the display of the first external apparatus that is to be shared. See block 52 of FIG. 4. The representation of the image of the first external apparatus may be generated in various manners including a representation that is based upon at least part of the image of the first external apparatus and/or a representation is based upon one or more features within the image of the first external apparatus. As described above in conjunction with operation 36 of FIG. 3, for example, the representation of the image of the first external apparatus may include a representation of one or more visual features of the image that have been extracted from the image and that define the representation of the image by serving as a key to the information that is presented upon the display of the first external apparatus that is to be shared. Alternatively, the representation of the image of the first external apparatus may be a color histogram that is generated by the processor with respect to the image of the first external apparatus and that serves to identify the information presented upon the display of the first external apparatus that is to be shared. Still further, a representation of the image of the first external apparatus may include the identification of a reference that was encoded via steganography into the image of the first external apparatus and that serves to identify the information presented upon the display of the first external apparatus that is to be shared.

In contrast to the reference encoded via steganography into the image of the first external apparatus that serves to identify the information upon the display of the first external apparatus, but does not identify the first external apparatus itself, the generation of the representation of the image of the first external apparatus does not include identifying a unique identifier that identifies the first external apparatus, such as by decoding a unique identifier of the first external apparatus that is displayed by the first external apparatus. Instead, the method, apparatus and computer program product of this embodiment are configured to generate a representation of the image of the first external apparatus that is representative of and identifies the image of the first external apparatus without specifically identifying the first external apparatus itself. Thus, the identification request that is provided to a plurality of external apparatuses may include the representation of the image of the first external apparatus and need not specifically identify the first external apparatus itself. Thus, the apparatus 20 may include means, such as the processor 22 or the like, for generating the representation of the image of the first external apparatus.

The apparatus 20, such as the processor 22, the communications interface 26 or the like, may also be configured to receive a response to the identification request from the first external apparatus indicating that the first external apparatus has presented the information upon the display of the first display apparatus. See block 56 of FIG. 4. In this regard, the response from the first external apparatus may indicate that the first external apparatus is currently presenting the information upon its display or has presented the information upon its display, such as within a predefined period of time preceding the identification request. In this regard, the predefined period of time may be predefined by the first external apparatus or may be defined by the apparatus with the first external apparatus being notified of the predefined period of time, such as within the identification request. Thus, the apparatus of an example embodiment may include means, such as the processor, the communications interface or the like, for receiving a response to the identification request. In addition to receiving a response to the identification request from the first external apparatus indicating that the first external apparatus has presented the information, the apparatus, such as the processor, the communications interface or the like, may also be configured to receive a response from one or more other external apparatuses indicating that one or more other external apparatuses have not presented the information that is the subject of the identification request, at least not within a predefined period of time preceding the identification request. While the other external apparatuses may provide responses indicating that the other external apparatuses did not present the information that is the subject of the identification request, some external apparatuses may simply be silent or otherwise fail to respond to the identification request in an instance in which the other external apparatuses did not present the information that is the subject of the identification request. Thus, the apparatus, such as the processor or the like, may also be configured to interpret the lack of a response from an external apparatus as an indication that the external apparatus did not present the information that is the subject of the identification request, at least not within the predefined period of time preceding the identification request.

Thereafter, after having identified the first external apparatus in the manner described above, the apparatus 20, such as the processor 22 or the communications interface 26, may cause communications to be established with the first external apparatus. See block 60 of FIG. 4. In this regard, the apparatus may pair with the first external apparatus that has been identified in order to support subsequent communications therewith. The apparatus of an example embodiment may therefore include means, such as the processor, the communications interface or the like, for causing communications to be established. In one embodiment described above in conjunction with blocks 38 and 40 of FIG. 3, the communications established by the apparatus with the first external apparatus may include the provision of a content request to the first external apparatus and the subsequent receipt, in response to the content request, of the content upon which the information presented upon display of the first external apparatus is based. In one embodiment, the apparatus, such as the processor or the like, may be configured to authenticate the first external apparatus based upon the information presented upon the display of the first external apparatus prior to generating the content request. The first external apparatus may be authenticated in various manners. Once authenticated, the content request may be directed to the first external apparatus in the manner described above. However, failure to properly authenticate the first external apparatus may prevent the content request from being provided and may, instead, cause the process to be performed again including, the capture of another image of the information presented upon the display of the first external apparatus.

From the perspective of the first external apparatus as may be embodied by or associated with the first computing device 10 in the embodiment of FIG. 1, the first external apparatus may include means, such as the processor 22, the communications interface 26 or the like, for receiving the identification request that includes a representation of the image of an apparatus including a representation of the information presented upon the display of the apparatus. See block 70 of FIG. 5. The first external apparatus may also include means, such as the processor or the like, for determining whether the information presented upon the display of the apparatus that is included within the identification request has been presented by the first external apparatus. See block 72 of FIG. 5. In this regard, the first external apparatus, such as the processor, may determine whether the information is currently presented upon the display of the first external apparatus or has been presented upon the display of the first external apparatus within a predefined time period prior to the time at which the identification request was received. Although the first external apparatus, such as the processor, may determine whether the information presented upon the display of the apparatus that is included within the identification request has been presented by the first external apparatus, a network entity may makes such a determination in another embodiment and may inform the apparatus that distributes the identification request and/or the first external apparatus.

In an instance in which the information presented upon the display of the apparatus that is included within the identification request is determined to have been presented, either currently or, in some embodiments, within a predefined time period in advance to the identification request, the first external apparatus may include means, such as the processor, the communications interface or the like, for causing a response to the identification request to be provided that indicates that the information presented upon the display of the first external apparatus has been presented. See block 74 of FIG. 5. Conversely, in an instance in which the information that is included within the identification request is determined to not have been presented, either currently or, in some embodiments, within a predefined time period of the receipt of the identification request, the first external apparatus may either send no response, thereby implicitly indicating that the first external apparatus did not present the information that is the subject of the identification request upon its display, or send an explicit response indicating that the information that is the subject of the identification request was not presented upon the display of the apparatus.

In an instance in which a response to the identification request indicates that the information was presented on the display of the first external apparatus, the first external apparatus may include means, such as the processor 22, the communications interface 26 or the like, for receiving a request from the apparatus that provided the identification request to establish communication with the apparatus. See block 76 of FIG. 5. In this regard, the first external apparatus may pair with the apparatus that provided the identification request in order to support subsequent communications therewith. In one embodiment described above in conjunction with blocks 38 and 40 of FIG. 3, the communications established by the first external apparatus with the apparatus that provided the identification request may include the receipt of a content request to establish communication with the second computing device 12. As described above, the content request may request the content upon which the information presented upon the display of the first external apparatus is based. In response to the content request, the first external apparatus, such as the processor, the communications interface or the like, may cause the content to be provided as described above in conjunction with FIG. 3.

As described above, a method, apparatus, and computer program product are provided according to example embodiments of the present invention in order to facilitate sharing of content between various computing devices. In this regard, the method, apparatus and computer program product provide for the sharing of content in an efficient and intuitive manner and without requiring the users of the computing devices to engage in an involved procedure in order to establish communications between the computing devices in advance of sharing the content. As also described above, the method, apparatus and computer program product of an example embodiment additionally provides for sharing of content in a manner that maintains the quality, such as the resolution and other properties, of the content.

As described above, FIGS. 3-5 illustrate flowcharts of an apparatus 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 24 of an apparatus 20 employing an embodiment of the present invention and executed by a processor 22 of the apparatus, such as may be embodied by or associated with a computing device that receives content in regards to FIGS. 3 and 4 and a computing device that provides content in regards to FIG. 5. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving an image of an external apparatus including information presented upon a display of the external apparatus;
identifying, based upon a time in the past at which the image of the external apparatus was captured, the information presented upon the display of the external apparatus;
causing, with a processor, a content request to be provided that requests content upon which the information presented upon the display of the external apparatus is based, wherein the content request is caused to be provided subsequent to presentation of the information upon the display of the external apparatus; and in response to the request, receiving the content upon which the information presented upon the display of the external apparatus is based.

2. A method according to claim 1 further comprising determining that the image includes an image of the display of the external apparatus.

3. A method according to claim 1 further comprising identifying the external apparatus based upon the image of the external apparatus.

4. A method according to claim 1 further comprising identifying, based upon the image of an external apparatus including information presented upon the display of the external apparatus, the information presented upon the display of the external apparatus.

5. A method according to claim 1 further comprising:
receiving a user input; and
causing the image of the external apparatus to be captured in response to the user input.

6. A method according to claim 1 further comprising receiving metadata associated with the content upon which the information presented upon the display of the external apparatus is based.

7. A method according to claim 1 further comprising utilizing object recognition to identify the display of the external apparatus.

8. A method according to claim 1 further comprising utilizing object recognition to identify the external apparatus.

9. A method according to claim 1 further comprising identifying the information presented upon the display based upon a color histogram of the information.

10. An apparatus comprising at least one processor and at least one memory including computer program code, the at least one memory and the computer program code configured to, with the processor, cause the apparatus to at least:
receive an image of an external apparatus including information presented upon a display of the external apparatus;
identify, based upon a time in the past at which the image of the external apparatus was captured, the information presented upon the display of the external apparatus;
cause a content request to be provided that requests content upon which the information presented upon the display of the external apparatus is based, wherein the content request is caused to be provided subsequent to presentation of the information upon the display of the external apparatus; and
in response to the request, receive the content upon which the information presented upon the display of the external apparatus is based.

11. An apparatus according to claim 10 wherein the at least one memory and the computer program code are further configured to, with the processor, cause the apparatus to determine that the image includes an image of the display of the external apparatus.

12. An apparatus according to claim 10 wherein the at least one memory and the computer program code are further configured to, with the processor, cause the apparatus to identify the external apparatus based upon the image of the external apparatus.

13. An apparatus according to claim 10 wherein the at least one memory and the computer program code are further configured to, with the processor, cause the apparatus to identify, based upon the image of an external apparatus including information presented upon the display of the external apparatus, the information presented upon the display of the external apparatus.

14. An apparatus according to claim 10 wherein the at least one memory and the computer program code are further configured to, with the processor, cause the apparatus to:
receive a user input; and
cause the image of the external apparatus to be captured in response to the user input.

15. An apparatus according to claim 10 wherein the at least one memory and the computer program code are further configured to, with the processor, cause the apparatus to receive metadata associated with the content upon which the information presented upon the display of the external apparatus is based.

16. A computer program product comprising at least one non-transitory computer-readable storage medium having computer-executable program code portions stored therein, the computer-executable program code portions comprising program code instructions for:
receiving an image of an external apparatus including information presented upon a display of the external apparatus;
identifying, based upon a time in the past at which the image of the external apparatus was captured, the information presented upon the display of the external apparatus;
causing a content request to be provided that requests content upon which the information presented upon the display of the external apparatus is based, wherein the content request is caused to be provided subsequent to presentation of the information upon the display of the external apparatus; and
in response to the request, receiving the content upon which the information presented upon the display of the external apparatus is based.

17. A computer program product according to claim 16 wherein the computer-executable program code portions further comprise program code instructions for determining that the image includes an image of the display of the external apparatus.

18. A computer program product according to claim 16 wherein the computer-executable program code portions further comprise program code instructions for identifying the external apparatus based upon the image of the external apparatus.

19. A computer program product according to claim 16 wherein the computer-executable program code portions further comprise program code instructions for identifying, based upon the image of an external apparatus including information presented upon the display of the external apparatus, the information presented upon the display of the external apparatus.

20. A computer program product according to claim 16 wherein the computer-executable program code portions further comprise program code instructions for:
receiving a user input; and
causing the image of the external apparatus to be captured in response to the user input.

* * * * *